United States Patent [19]

Moore

[11] 4,325,637
[45] Apr. 20, 1982

[54] PHASE MODULATION OF GRAZING INCIDENCE INTERFEROMETER

[75] Inventor: Robert C. Moore, Rochester, N.Y.

[73] Assignee: Tropel, Inc., Fairport, N.Y.

[21] Appl. No.: 155,203

[22] Filed: Jun. 2, 1980

[51] Int. Cl.³ .............................................. G01B 11/24
[52] U.S. Cl. .................................................. 356/359
[58] Field of Search ................ 356/345, 357, 358, 359

[56] References Cited

U.S. PATENT DOCUMENTS 2,518,647  8/1950  Teeple et al. ...................... 356/357
4,072,423  2/1978  Kimura et al. ..................... 356/357

FOREIGN PATENT DOCUMENTS 48347  4/1977  Japan .................................. 356/357

OTHER PUBLICATIONS

Synborski, Edward, "The Interferometric Analysis of Flatness by Eye and Computer", Proceedings of the Society of Photo-Optical Instrumentation Engineers, vol. 135, pp. 104–110, Apr. 10–11, 1978.
Bruning; J. H. et al, "Digital Wavefront Measuring Interferometer for Testing Optical Surfaces and Lenses" Applied Optics, vol. 13, pp. 2693–2703, Nov. 1974.
TROPEL, Inc. pamphlet: "System 9,000".

*Primary Examiner*—John K. Corbin
*Assistant Examiner*—Bruce Y. Arnold
*Attorney, Agent, or Firm*—Stonebraker, Shepard & Stephens

[57] ABSTRACT

Phase is modulated in a grazing incidence interferometer by modulating the incidence angle and spacing the test surface far enough from the reference surface so that the incidence angle modulation changes the phase relationship between the interferring beam reflected from the test surface and the reference beam reflected from the reference surface substantially more than it changes the sensitivity of the interferometer to surface variations between the reference and test surfaces. The preferred way of accomplishing this is with tiltable mirror 15 modulating the incidence angle slightly relative to prism 11 with its reference surface 12 and test surface 13 spaced from reference surface 12 in interferometer 10. An electromagnetic element 16 such as a galvanometer is preferred for tilting mirror 15.

8 Claims, 2 Drawing Figures

PHASE MODULATION OF GRAZING INCIDENCE INTERFEROMETER

BACKGROUND

Grazing incidence interferometers are generally known for determining the topography of a test surface, and among other advantages, they are easily adjustable in sensitivity to provide a zoom effect allowing a test surface to be measured with varying precision. They change sensitivity by adjusting the incidence angle; and they use a prism surface as a reference surface and place the test surface in contact with the reference surface.

Another development in interferometry separate from grazing incidence interferometers is phase modulation to move fringes so as to distinguish between hills and valleys on the test surface. This can be done manually with a finger tip touch by an observer who notices the fringe movement and determines the direction of test surface slopes. Phase modulation is also used in detection systems involving computer analysis to make the same distinctions between hills and valleys and use the computer to process and present information about the test surface. Phase modulation in computer controlled systems has been accomplished by piezoelectric transducers arranged to move the reference mirror.

To apply phase modulation as developed in the interferometry art to a grazing incidence interferometer would require relative movement between the test surface and reference surface that are normally placed in contact. Moving either the test surface or the reference surface relative to the other is so difficult and troublesome that phase modulation has not been applied to grazing incidence interferometers.

My invention recognizes a simple and effective way to accomplish phase modulation in a grazing incidence interferometer. It avoids the problems of moving the test or reference surfaces relative to each other and achieves excellent results in a simple and inexpensive way.

SUMMARY OF THE INVENTION

To modulate phase in a grazing incidence interferometer, I modulate the incidence angle of the interferometer, and to avoid changing the instrument's sensitivity as the incidence angle changes, I space the test surface far enough from the reference surface so that the incidence angle modulation changes phase substantially more than sensitivity. Although the instrument's sensitivity unavoidably changes somewhat as incidence angle varies near the critical angle for the instrument, I have found that spacing the test surface from the reference surface scales up or enlarges the different distances travelled by the interfering beams so that phase is affected much more than sensitivity. Sensitivity changes can then be either ignored as minor inaccuracies, or can be compensated for by a computer in the detection system. Phase modulation is then easily achieved by tilting a mirror in the incident beam path.

DRAWINGS

FIG. 1 is a schematic view of one preferred embodiment of the inventive phase modulation system for a grazing incidence interferometer; and FIG. 2 is a schematic diagram of the paths of interfering beams in the interferometer of FIG. 1.

DETAILED DESCRIPTION

Figure 2:
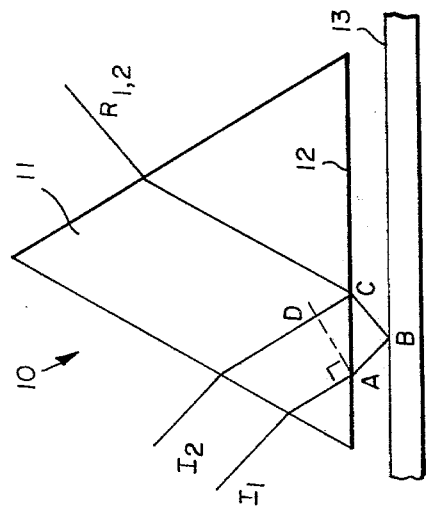

Grazing incidence interferometer 10 as schematically shown in the drawings uses a prism 11 providing a reference surface 12; and test surface 13, instead of being in contact with reference surface 12, is spaced a small and fixed distance away from surface 12 according to my invention. This spacing should be at least 0.015 millimeters and is preferably about 0.075 millimeters with a larger maximum spacing possible but limited by other practicalities.

As exaggerated in FIG. 2, incident rays $I_1$ and $I_2$ refract through prism 11 with $I_1$ reflecting off test surface 13 and $I_2$ reflecting off reference surface 12 to interfere in reflected beam $R_{1,2}$. During the time that ray $I_1$ passes through points A, B and C in reflecting off test surface 13, ray $I_2$ passes only the distance between points D and C, establishing different path lengths for interference purposes, depending on the contour of test surface 13.

Spacing test surface 13 at a distance from reference surface 12 proportionally enlarges the distance between points A, B and C relative to distance D, C. Although a change in incidence angle changes the distances travelled by both beams, the longer distance A, B, C maintains the same relatively large proportion to the shorter distance D, C and changes by a larger magnitude. From this relationship, slight changes in the incidence angle that barely affect sensitivity are adequate to change phase enough to move fringes for phase modulation purposes. In other words, by spacing test surface 13 away from reference surface 12, a slight change in incidence angle affects the phase relationship between rays $R_1$ and $R_2$ to a much greater extent than the same change in incidence angle affects the sensitivity of interferometer 10. This can be seen intuitively from the drawings, and can be proved mathematically, but the proof is complex and is omitted for simplicity.

Figure 1:
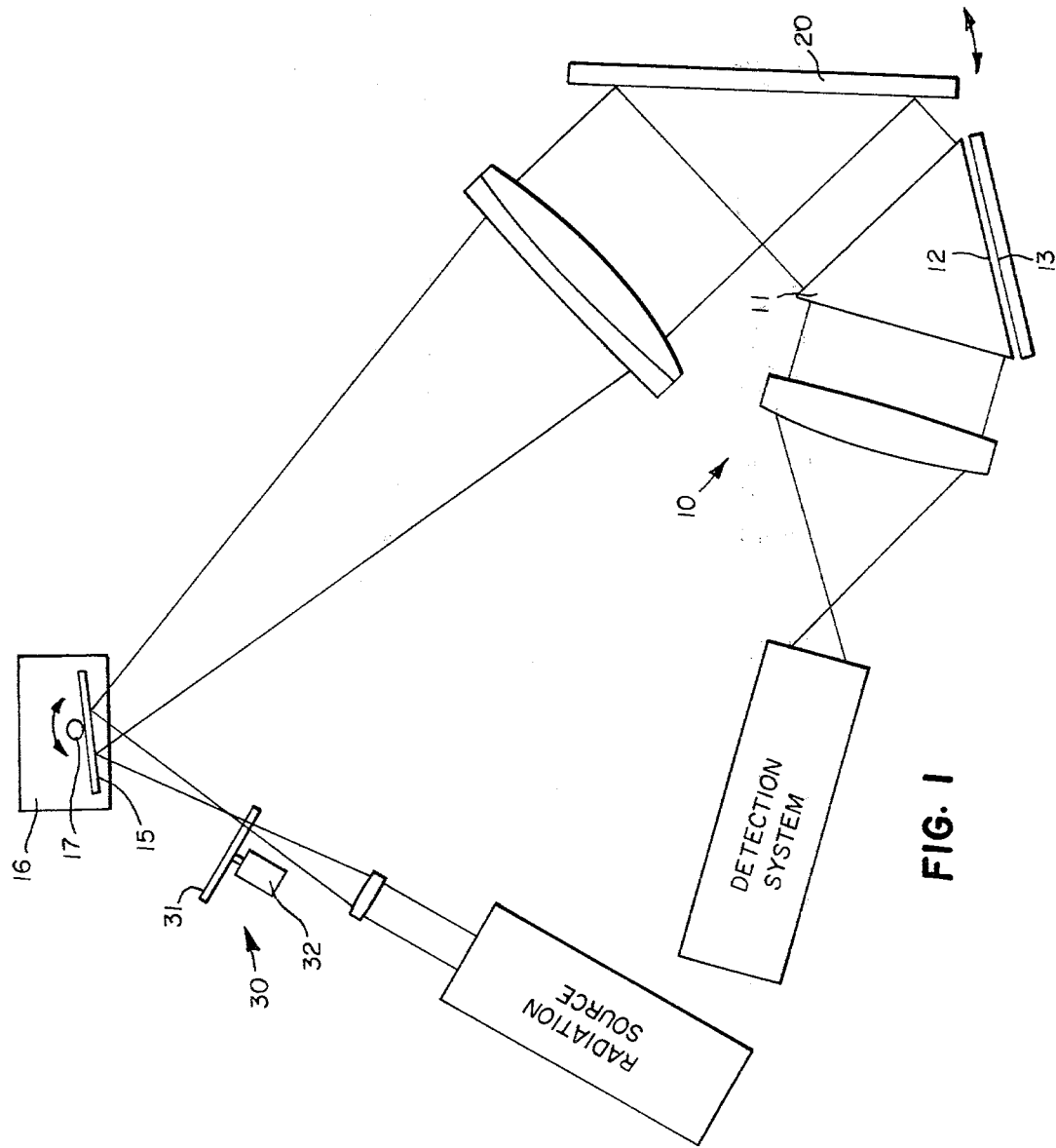

Changing the incidence angle of interferometer 10 can be done in several ways, and the preferred way as schematically shown in FIG. 1 is with a folding mirror 15 that is tiltable, preferably by an electromagnetic drive such as galvanometer 16 turning shaft 17 supporting mirror 15. Piezoelectric elements, other electromagnetic drives, and even mechanical drives are possible for tilting mirror 15 slightly in a movement that is preferably uniform and regular to modulate the incidence angle slightly and thereby modulate phase and move the interference fringes for the benefit of the detection system.

The overall sensitivity of interferometer 10 is adjusted in a generally known way by changing the orientation of mirror 20 to adjust the incidence angle. This establishes any zoom effect and adjusts the number of fringes desired for the surface 13 being measured. Instrument sensitivity is established by the angle of mirror 20 and generally remains constant while mirror 15 tilts to modulate the incidence angle slightly and primarily affect phase relationship.

Interferometer 10 also benefits from a "coherence buster" formed as a ground glass disk 31 rotated in the path of the incident beam by a motor 32. A rotating ground glass has been used in other interferometers to reduce the coherence of the incident beam for other purposes, but in interferometer 10 this is especially advantageous in reducing the effect of multiple reflections between reference surface 12 and test surface 13, which are both polished surfaces. Such multiple reflections produce high finesse fringe lines that cause problems for the detection system, which is arranged to process cosine fringes produced by single reflections from test surface 13 and reference surface 12.

Interferometer 10 can also have many other refinements that are generally known and used in grazing incidence interferometers, but are omitted from the drawings for simplicity. Those skilled in the art of grazing incidence interferometers will be able to apply this invention in many ways, once they understand the basic relationship involved.

I claim:

1. A method of modulating phase in a grazing incidence interferometer having a light beam generating means, a reference surface, and a test surface, said method comprising:
   a. modulating the angle of incidence of said light beam onto said reference surface; and
   b. spacing said test surface far enough from said reference surface so that said modulation of said angle of incidence of said light beam onto said reference surface changes the phase relationship between the interferring beam reflected from said test surface and the reference beam reflected from said reference surface substantially more than it changes the sensitivity of said interferometer to surface variations between said reference and test surfaces.

2. The method of claim 1 including spacing said test surface about 0.075 mm. from said reference surface.

3. The method of claim 1 including using an electrically tilting mirror positioned between said light beam generating means and said reference surface for modulating said incidence angle.

4. The method of claim 1 including rotating a ground glass positioned in the beam path between said light beam generating means and said reference surface.

5. A phase modulation system for a grazing incidence interferometer having a light beam generating means, a reference surface, and a test surface, said system comprising:
   a. a movable mirror positioned between said light beam generating means and said reference surface for modulating the angle of incidence of said light beam onto said reference surface; and
   b. said test surface being spaced far enough from said reference surface so that said modulation of said angle of incidence of said light beam onto said reference surface changes the phase relationship between the interferring beam reflected from said test surface and the reference beam reflected from said reference surface substantially more than it changes the sensitivity of said interferometer to surface variations between said reference and test surfaces.

6. The system of claim 5 including an electromagnetic element arranged for tilting said mirror.

7. The system of claim 5 wherein said test surface is spaced from said reference surface by about 0.075 mm.

8. The system of claim 5 including a rotating ground glass positioned in the beam path between said light beam generating means and said reference surface.

* * * * *